May 12, 1964  C. M. HAYWARD  3,133,211
ELECTRONIC APPARATUS FOR FOLLOWING PEAK
OR VALLEY SIGNAL AMPLITUDE
Filed Aug. 3, 1962  2 Sheets-Sheet 1

INVENTOR.
C. MICHAEL HAYWARD
BY Weingarten,
Orenbuch, &
Pandiscio
ATTORNEYS

May 12, 1964
C. M. HAYWARD
3,133,211
ELECTRONIC APPARATUS FOR FOLLOWING PEAK
OR VALLEY SIGNAL AMPLITUDE
Filed Aug. 3, 1962
2 Sheets-Sheet 2
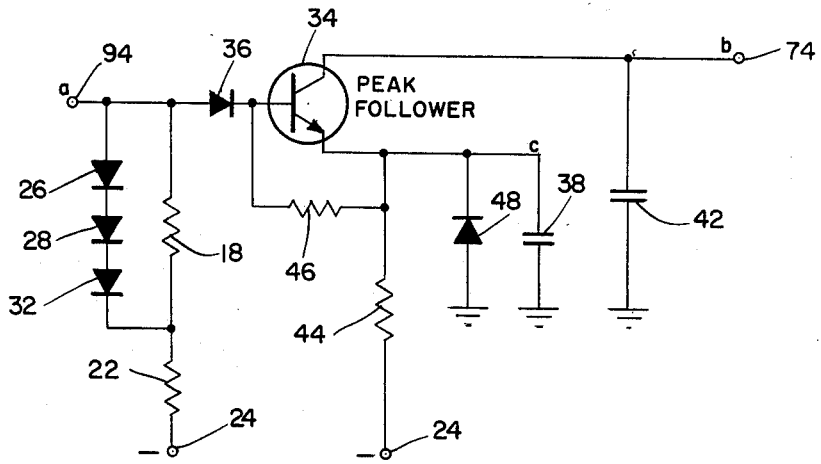
FIG. 2
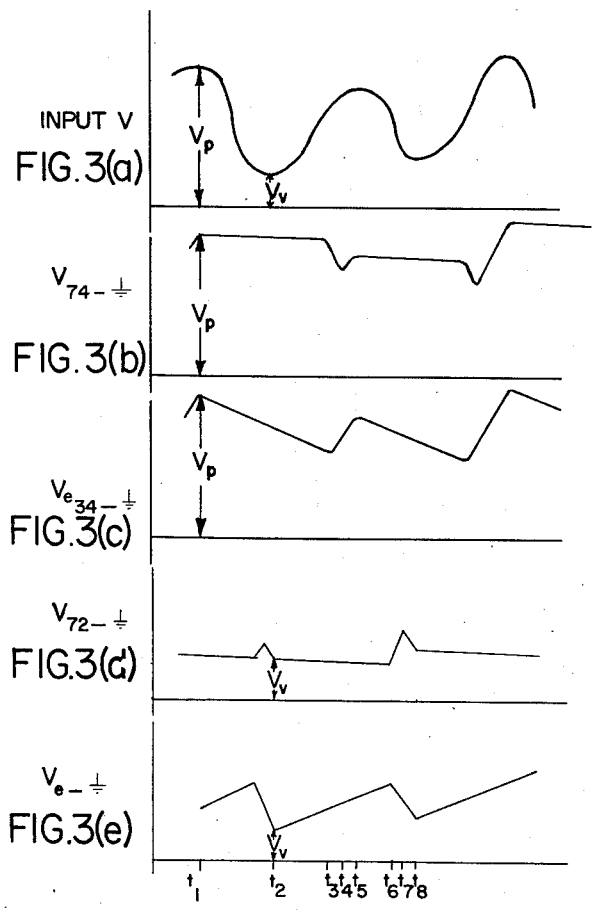
INVENTOR.
C. MICHAEL HAYWARD
BY Weingarten,
Orenbuch, &
Pandiscio
ATTORNEYS United States Patent Office 3,133,211
Patented May 12, 1964

3,133,211
ELECTRONIC APPARATUS FOR FOLLOWING PEAK OR VALLEY SIGNAL AMPLITUDE
Charles Michael Hayward, Brockton, Mass., assignor to Epsco, Incorporated, Cambridge, Mass., a corporation of Massachusetts
Filed Aug. 3, 1962, Ser. No. 214,640
6 Claims. (Cl. 307—88.5)

This invention relates in general to electrical signal detection devices and more particularly to apparatus for determining the positive and negative peak amplitudes of an electrical signal.

The primary object of the invention is to provide apparatus for measuring the positive or negative peak amplitudes of an alternating-current (A.C.) signal having a direct-current (D.C.) component. Advantages inherent in the invention are: (1) an output electrical signal which has an extremely small droop between successive cycles of the A.C. input, and yet, when the signal is removed, the output signal falls to zero after a few cycles; (2) quick response to both increasing and decreasing peak amplitudes; and (3) good linearity from low- to full-scale inputs.

The invention resides in an arrangement of apparatus constituting an electrical device for indicating either the peak voltage or the valley voltage of an input electrical signal having a D.C. component in addition to the fluctuating component. The invention in the case of the peak follower employs a transistor to regulate the charging of two capacitors, the output signal being derived from the voltage across one of those capacitors. The two capacitors are permitted to charge to the peak voltage of the input signal with the transistor acting as a low impedance switch. When the input signal falls away from its peak value, the transistor becomes an open switch; that is, disconnects the capacitors from the input signal. During the time that the transistor is an open switch, the first capacitor discharges through a circuit provided for that purpose whereas the second capacitor retains its charge because it is coupled to the very high impedance of an output stage. When the charge on the first capacitor reaches a level below the level of the fluctuating input signal applied to the transistor, the transistor operates in the normal mode of a transistor and becomes a switch placing the two capacitors in series. The second capacitor thereupon discharges into the first capacitor until the voltage across both capacitors becomes equal. As the voltage of the input signal increases towards a new peak, the transistor again acts as a low impedance switch and both capacitors charge to the new peak voltage and the cycle is repeated.

The valley follower employs a similar arrangement of apparatus modified to permit the capacitors to charge and discharge where the corresponding sequence of action of the capacitors in the peak follower is to discharge and charge.

The invention, both as to its arrangement and manner of operation, can be better understood from a perusal of the following exposition when considered in connection with the accompanying drawings in which:

FIG. 2 illustrates a portion of the arrangement of FIG. 1; and

FIGS. 3(a–e) are curves showing the voltages at various portions of the circuit of FIG. 2.

Figure 1:
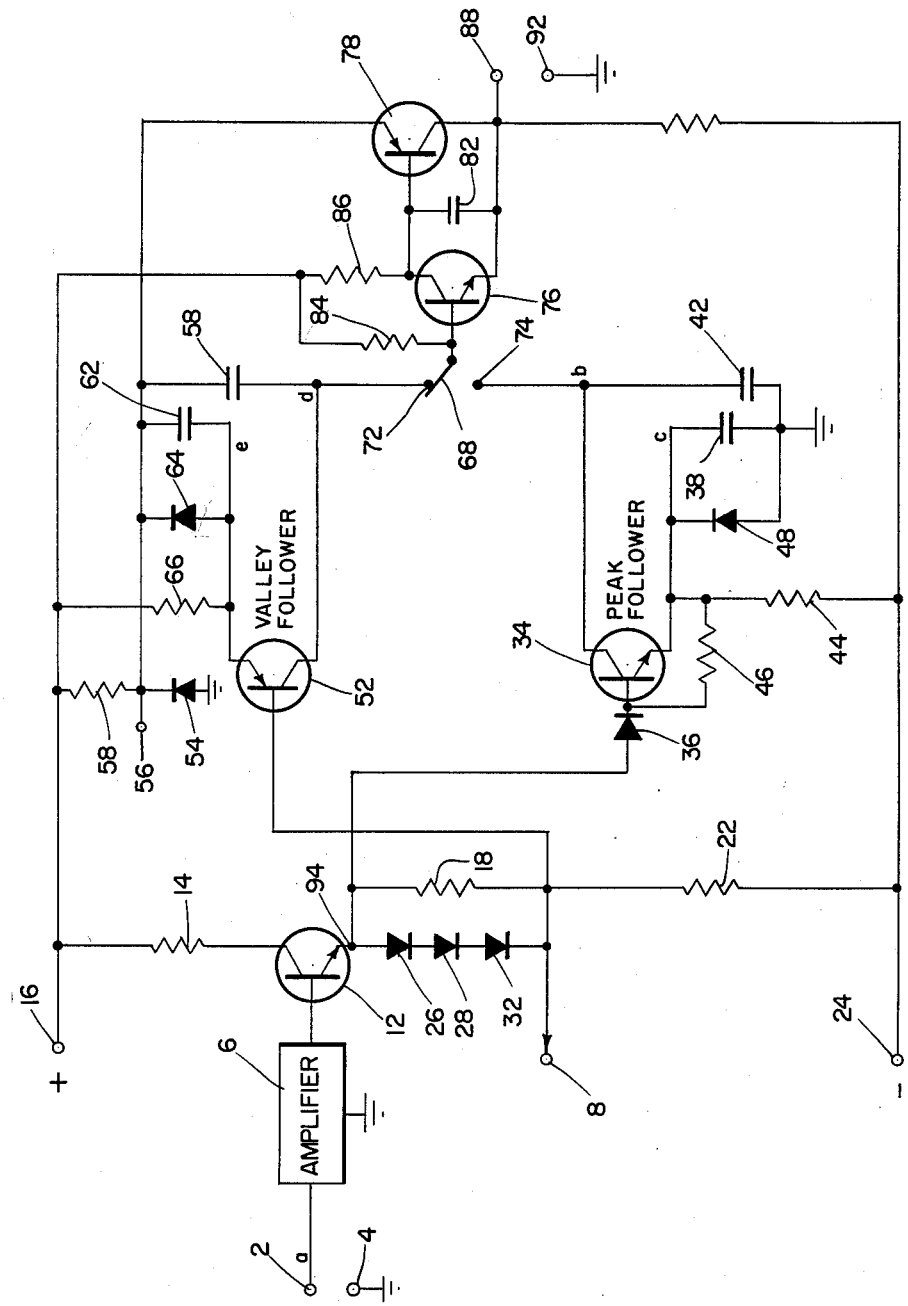
FIG. 1 depicts the schematic arrangement of the preferred embodiment of the invention.

Referring now to FIG. 1, there is depicted a preferred embodiment of the invention having a pair of signal input terminals 2 and 4 which are intended for connection to a source of pulsating D.C. signals, the peaks and valleys of which are to be measured relative to some reference potential such as ground. Indicated by block 6 is a conventional direct-current (D.C.) amplifier whose gain is stabilized by a negative feedback connection shown at 8.

The output of the D.C. amplifier is furnished through an emitter-follower stage. The stage is constituted by a transistor 12 whose collector is connected by a current-limiting resistor 14 to a source of positive potential impressed at terminal 16 and whose emitter is connected by serial resistors 18 and 22 to terminal 24 at which a negative voltage is impressed. The resistor 18 is shunted by three diodes 26, 28, and 32, whose purpose is explained below.

The output of the emitter-follower stage is applied to peak and valley follower circuits. The peak follower stage comprises an NPN transistor 34 whose base is serially connected to the emitter of transistor 12 through a diode 36. The diode 36 prevents the emitter-base junction of transistor 34 from breaking down when it is reversely biased. The emitter of transistor 34 is connected to ground through a capacitor 38 and the collector is connected to ground through a capacitor 42. The emitter of transistor 34 is also connected to the source of negative potential at the terminal 24 through a resistor 44. A leakage resistor 46 is connected across the emitter-base junction to provide a path for the emitter-base leakage current when transistor 34 is not conducting. A diode 48 is connected across the capacitor 38, thereby clamping the capacitor to ground should a reverse voltage be applied.

The valley-follower circuit employs a PNP transistor 52. The base of the transistor 52 is connected to the emitter of transistor 12 through the parallel path comprising the resistor 18 and diodes 26, 28, 32. A zener diode 54 has its anode connected to ground and its cathode to a terminal 56. A resistor 58, which is connected between the positive source of reference potential 16 and the terminal 56, provides the proper bias current for the zener diode 54. The collector of transistor 52 is connected to terminal 56 through a capacitor 58 and the emitter of transistor 52 is connected to terminal 56 through a capacitor 62. A diode 64 is connected across the capacitor 62, thereby clamping the capacitor 62 to the potential at terminal 56 should a reverse voltage be applied. A resistor 66 connects the emitter of transistor 52 to the source of positive potential 16.

Diodes 26, 28, and 32 are provided to compensate for the base-to-collector voltage drops of transistors 34 and 52 and for the voltage drop across diode 36. The purpose of these three diodes is to insure that the peak and valley follower stages do not have an offset voltage between them. Further, it has been found preferable to provide a resistor 18 in parallel across the three diodes 26, 28, and 32, wherein the total voltage drop across resistor 18 and the three diodes 26, 28, 32 in parallel is equal to the sum of the voltage drop across the diode 36 and the base-to-collector voltage drops off transistors 34 and 52.

The output signal proceeds through a switch 68 which is set to either terminal 72 or 74, depending upon whether the valley or peak of the input signal to the circuit is desired. The output stage utilizes a pair of transistors 76, 78 having a capacitor 82 connected across the collector and emitter of NPN transistor 76 and the base and collector of PNP transistor 78 to shape the loop response of the feedback path. A resistor 84 is connected to the base of transistor 76 and to the source of positive potential 16 to provide the proper bias for the transistor 76. A load resistor 86 is connected between the source of positive potential 16 and the collector of transistor 76. The output signal is taken simultaneously from the emitter of transistor 76 and the collector of transistor 78 across a pair of output terminals 88, 92. Since transistor 76 has only to supply the base current to transistor 78, while transistor 78 in turn supplies the output current, the change in the base-to-emitter voltage of transistor 76 will be small with changes in load current. This base-to-emitter voltage is the only difference between the voltage input to the stage and the output voltage obtained from the stage, and therefore, the gain of the stage is close to unity and linearity is good.

The letters $a, b, \ldots e$ appearing in FIGS. 1 and 2 indicate those places in the apparatus where the correspondingly lettered waveforms of FIG. 3 appear.

Referring now to the circuit of the peak follower shown in FIG. 2 and the waveforms depicted in FIG. 3, it is assumed that the waveform of FIG. 3($a$) represents the input signal applied to terminal 94 in FIG. 2. Terminal 94 represents a junction at which is present the output signal from the emitter of transistor 12 of FIG. 1. FIG. 3($b$) indicates the voltage at terminal 74 with respect to ground which is the voltage across capacitor 42, and FIG. 3($c$) indicates the voltage at the emitter of transistor 34 with respect to ground which is the voltage across capacitor 38.

When the positive going portion of the signal shown in FIG. 3($a$) is applied to the base of transistor 34, the transistor saturates and both the base-to-emitter and base-to-collector junctions conduct, causing capacitors 38 and 42 to charge to the positive peak $V_p$ through the low forward impedance of these junctions. After time $t_1$, when the peak is passed, the base-to-emitter and base-to-collector junctions of transistor 34 become reversely biased and the transistor no longer conducts. The charge in capacitor 38 causes diode 48 to be reversely biased so that the diode is non-conductive. Capacitor 38 commences to discharge through resistor 44 as indicated in FIG. 3($c$) by the decrease in voltage between time $t_1$ and $t_3$. During that interval, capacitor 42 holds its charge, as indicated by the waveform of FIG. 3($b$), because of the high impedance presented at terminal 74 by the output stage. The input signal, FIG. 3($a$), at time $t_3$, causes the emitter-base junction of transistor 34 to become forwardly biased while the charge across capacitor 42 maintains a reverse bias across the collector-base junction. Transistor 34, therefore, operates in the normal mode of a transistor, permitting capacitor 42 to discharge rapidly into capacitor 38. The voltage across capacitor 42 consequently drops sharply, as indicated in FIG. 3($b$), while the voltage across capacitor 38 rises as indicated in FIG. 3($c$) until at time $t_4$ both voltages are equal. Since the input signal is swinging more positive at this time, both junctions of the transistor become forwardly biased and the transistor saturates. Capacitors 38 and 42, therefore, charge to the new peak reached at time $t_5$ to start a new cycle which repeats with each pulsation of the input signal.

Referring once again to the circuit of the valley follower which is shown in FIG. 1 and the waveforms depicted in FIG. 3, it is again assumed that the waveform of FIG. 3($a$) represents the input signal applied to terminal 94. FIG. 3($d$) indicates the voltage at terminal 72 with respect to ground which is the voltage at terminal 56 minus the voltage across capacitor 58, and FIG. 3($e$) indicates the voltage at the emitter of transistor 52 with respect to ground which is the voltage at terminal 56 minus the voltage across capacitor 62.

When the negative going portion of the signal shown in FIG. 3($a$) is applied to the base of transistor 52, the transistor saturates and both the base-to-emitter and base-to-collector junctions conduct, causing capacitors 58 and 62 to charge to the negative voltage $V_v$ through the low forward impedances of these junctions. After time $t_2$, when the valley is passed, the base-to-emitter and base-to-collector junctions of transistor 52 become reversely biased and the transistor no longer conducts. The potential at terminal 56 is sufficiently high compared to the charge in capacitor 62 and causes diode 64 to be reversely biased so that the diode is non-conductive. Capacitor 62 commences to discharge through resistor 66 as indicated in FIG. 3($e$) by the increase in voltage between time $t_2$ and $t_6$. During that interval, capacitor 58 holds its charge, as indicated in FIG. 3($d$), because of the high impedance presented at terminal 72 by the output stage. The input signal, FIG. 3($a$), at time $t_6$, causes the emitter-to-base junction of transistor 52 to become forwardly biased while the charge across capacitor 58 maintains a reverse bias across the collector-base junction. Transistor 52, therefore, operates in the normal mode of a transistor, permitting capacitor 58 to charge rapidly into capacitor 62. The voltage across capacitor 62 consequently rises sharply whereas the voltage across capacitor 58 drops swiftly, as indicated in FIG. 3($e$), until at time $t_7$ both voltages are equal. Since the input signal is swinging more negative at this time, both junctions of the transistor become forwardly biased and the transistor saturates. Capacitors 58 and 62, therefore, charge to the new valley reached at time $t_8$ to start a new cycle which repeats with each pulsation of the input signal.

Although the peak follower described is designed to accept only signals which are positive with respect to the zero axis, it can be quite simply modified for positive and negative inputs, with or without a D.C. component. Further, although switching means are shown for connecting the peak and valley following circuits to the output stage, two output circuits could be provided so that the peak and valley signals could be read together without switching.

Accordingly, it is to be understood that the invention is not limited in its application to the details of construction specifically described or illustrated and that within the scope of the appended claims, it may be practiced otherwise than as specifically described or illustrated.

What is claimed is:

1. Apparatus for providing an output signal which follows the peak amplitude of an A.C. input signal having a D.C. component comprising:
   a transistor;
   first and second capacitors connected in series between the transistor's emitter and collector;
   the junction of the first and second capacitors being connected to a source of reference potential;
   means for applying the input signal to the base of the transistor;
   means providing a discharge path for the first capacitor when the transistor is cut off;
   and a circuit having a high input impedance, the circuit having its input connected to the second capacitor and providing an output signal proportional to the charge in the second capacitor.

2. Apparatus in accordance with claim 1, further comprising a unidirectional conductor connected in parallel with the first capacitor.

3. Apparatus in accordance with claim 1 wherein the high input impedance circuit comprises:
   an NPN transistor whose base is the circuit's input;
   a PNP transistor having its base connected to the emitter of the NPN transistor and its collector connected to the NPN transistor's emitter;
   means for applying potentials to the collectors of the two transistors to reversely bias the collector-base junctions;
   and means holding the PNP transistor's emitter at a fixed potential.

4. Apparatus for providing an output signal which follows the peak amplitude of an A.C. input signal having a D.C. component, comprising:
   a switching transistor;
   a first capacitor connecting the transistor's emitter to a source of reference potential;
   a second capacitor connecting the transistor's collector to a source of reference potential;
   means for applying the input signal to the base of the transistor to cause the transistor to saturate and permit the charge across both capacitors to reach the peak value of the input signal;

means providing a discharge path for the one capacitor;

and a high input impedance circuit connected to the other of the capacitors and providing an output signal proportional to the charge in the capacitor.

5. Apparatus in accordance with claim 4 and further including a unidirectional conductive device shunting one of the capacitors.

6. Apparatus in accordance with claim 4 wherein the high input impedance circuit includes a pair of transistors each having a base, emitter, and a collector;

the base of the first transistor being connected to the other of the capacitors;

the collector of the first transistor being connected to the base of the second transistor;

and wherein the output signal is taken simultaneously from the emitter of the first transistor and the collector of the second transistor.

References Cited in the file of this patent

UNITED STATES PATENTS

| | | |
|---|---|---|
| 2,708,718 | Weiss | May 17, 1955 |
| 3,017,521 | Herstedt | Jan. 16, 1962 |